United States Patent [19]
Lin

[11] Patent Number: 6,142,264
[45] Date of Patent: Nov. 7, 2000

[54] BRAKE DEVICE FOR CHILDREN'S VEHICLE

[75] Inventor: Kun-Chung Lin, Tai Pao, Taiwan

[73] Assignee: Link Treasure Limited, Turtola, Virgin Islands (Br.)

[21] Appl. No.: 09/280,903

[22] Filed: Mar. 29, 1999

[51] Int. Cl.[7] .................................................. F16D 51/00
[52] U.S. Cl. ............................................. 188/75; 188/20
[58] Field of Search .......................... 188/75, 76, 2 D, 188/336, 338, 339, 20

[56] References Cited

U.S. PATENT DOCUMENTS

| | | | |
|---|---|---|---|
| 3,596,739 | 8/1971 | Ramsey et al. | 188/75 |
| 3,986,586 | 10/1976 | Mauger et al. | 188/75 |
| 4,234,063 | 11/1980 | Blake | 188/75 |
| 4,305,482 | 12/1981 | Arai | 188/2 D |
| 5,090,522 | 2/1992 | Korff | 188/75 |
| 5,131,509 | 7/1992 | Moon et al. | 188/77 W |
| 5,293,965 | 3/1994 | Nagano | 188/2 D |

*Primary Examiner*—Michael Mar
*Assistant Examiner*—Xuan Lan Nguyen
*Attorney, Agent, or Firm*—W. Wayne Liauh

[57] ABSTRACT

The present invention provides a brake device for a children's vehicle which overcomes the drawbacks of a conventional brake device that causes different braking force when the wheel rotating in different directions. The brake device of the present invention is constituted by a brake disc rotating along with the wheel; and a pair of brake shoes pivotally secured by one end at a fixed portion relatively to the brake disc and capable of counterly fastening the circumference of the brake disc. When braking, the brake shoes rotate pivotally by the fixed portion to fasten the brake disc and stop the wheel. Since the pair of brake shoes always provide together a major and a minor braking force whenever the wheel rotates clockwise or counterclockwise, they always provide the same braking performance.

4 Claims, 5 Drawing Sheets

BRAKE DEVICE FOR CHILDREN'S VEHICLE

BACKGROUND OF INVENTION

The present invention relates to a brake device for children's vehicle, and particularly to a brake improvement which overcomes the drawbacks of a conventional brake device that causes different braking force when the wheel rotating in different directions.

A conventional brake device for a motorized children's vehicle is shown in FIG. 1 in which a brake drum 12 and a brake band 14 are shown. The working condition of the brake device is further illustrated in FIG. 2 for depiction of its problem during working.

As shown in FIG. 1, a conventional brake device for a motorized children's vehicle includes a C-shaped brake band 14 surrounding a brake drum 12 which is coaxially formed with the wheel 10. Generally, the brake band 14 and the brake drum 12 of a motorized children's vehicle are made of stiff plastics. By fastening the brake band 14 on the brake disc 12, the wheel 10 can be braked. In the motorized children's vehicle, two rear wheels 10 are driven individually by two unshown driving mechanisms 20 for moving the vehicle forwards and backwards. The brake drum 12 rotating along with the wheel 10 will be braked when the brake band 14 is fastened to provide friction force to the brake drum 12.

The C-shaped brake band 14 surrounds a circular groove furnished on the brake drum 12, and is fixedly mounted on the driving mechanism 20 or the frame of the vehicle through a pivot 16. A pulling wire 24 has one end coming through two parallel ends of the C-shaped brake band 14, and the other end linking to an unshown brake pedal or handle. An adjuster 26 having an expansion spring 23 and a screw 28 is used to adjust the tension and stroke of the pulling wire 24. When the wire 24 is pulled by the brake pedal or handle, the brake band 14 then fastens the brake drum 12, i.e. the wheel 10, based on the pivot 16.

The wheel 10 may rotates forwards or backwards, i.e. the brake drum 12 rotates clockwise or counterclockwise, as shown in FIG. 2. The force direction of the pulling wire 24 when fastening the brake band 14 to the brake drum 12 is always in the direction as shown by the dashed (clockwise) arrow. When the brake drum 12, i.e. the wheel 10, rotates clockwise as same as the fastening direction of the brake band 14, the friction force of the brake band 14 to the brake drum 12 will enhance the fastening force and make an effective brake. But when the brake drum 12, i.e. the wheel 10, rotates counterclockwise and reversely to the fastening direction of the brake band 14, the friction force of the brake band 14 to the brake drum 12 will counter the fastening force, loosen the brake band 14 from the brake drum 12 and decrease the brake performance. From the aforesaid description, we know that the brake force of a conventional brake device for a motorized children's vehicle will vary when the wheel rotates forwards or backwards and will cause a problem.

SUMMARY OF INVENTION

The present invention is therefore to provide a brake device for a children's vehicle which will overcome the drawbacks of a conventional brake device that causes different braking force when the wheel rotates in different directions.

According to the above features, a brake device of the present invention is constituted by a brake drum rotating along with the wheel; and a pair of brake shoes pivotally secured by one end at a fixed portion relatively to the brake drum and capable of counterly fastening the circumference of the brake drum. Therefore, when braking, the brake shoes will rotate pivotally by the fixed portion to fasten the brake drum and stop the wheel.

As described above, one end of each brake shoe is pivotally secured at a fixed portion, while the other free ends thereof are connected to a cam which is operated by a pulling wire. The cam will rotate the free ends of the brake shoes based on the pivot ends and fasten the brake drum when the wire is pulled. In an embodiment, the free ends of the brake shoes are directly connected to two operational portions of a pulling wire and actuated by the wire to fasten the brake drum. The brake shoes can be two semicircular hoops pivotally secured at one end on a fixed portion and counterly formed a circular hoop around the brake drum. Otherwise, the brake shoes can be two circular hoops each pivotally secured at one end on a fixed portion and formed two circular hoops in parallel around the brake disc.

BRIEF DESCRIPTION OF DRAWINGS

The objects and advantages of the invention will be apparent from the following detailed description of preferred embodiments thereof, reference being made to the accompanying drawings, in which.

DESCRIPTION OF PREFERRED EMBODIMENTS

Figure 3:
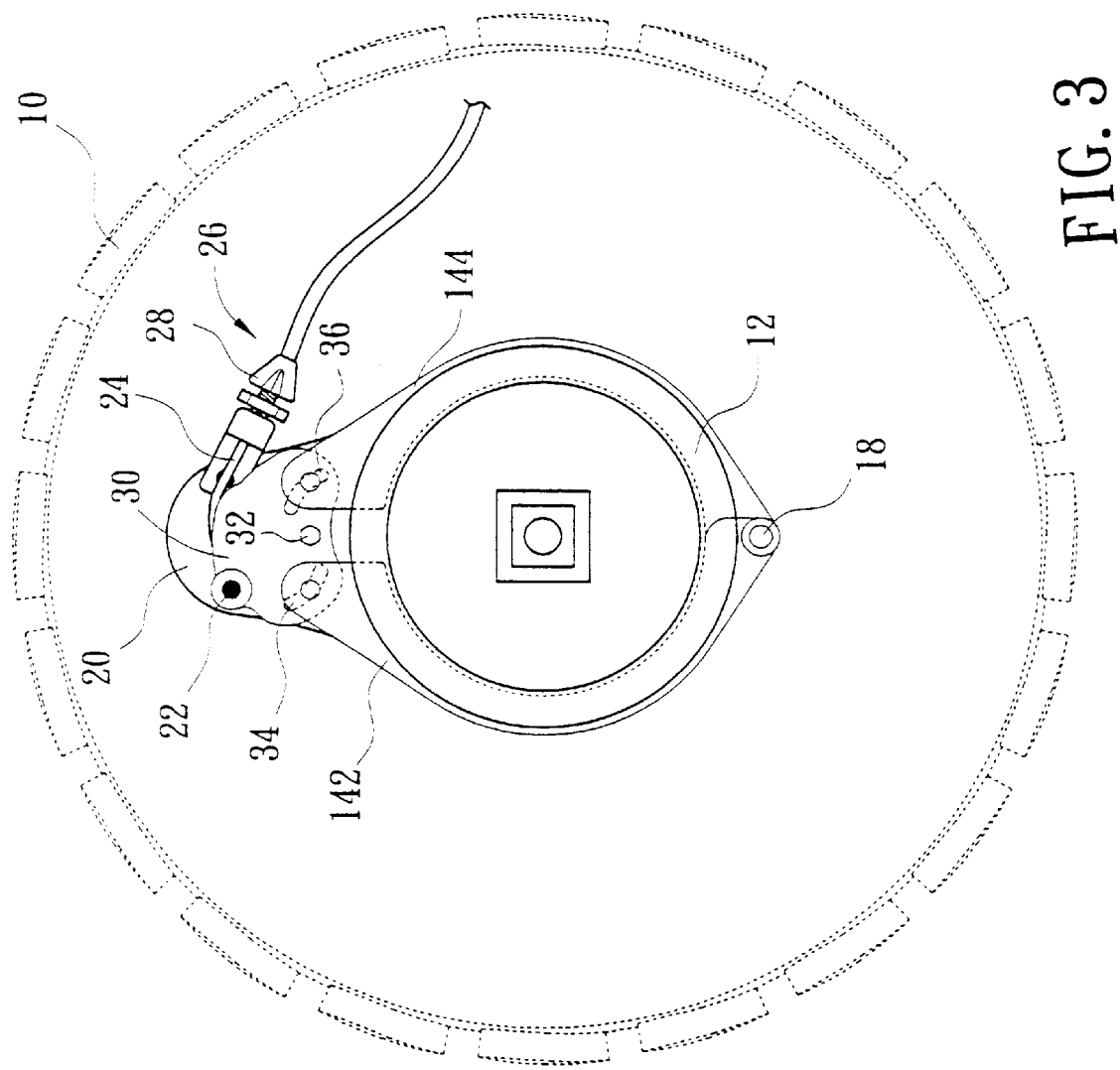
FIG. 3 is a brake device as a first embodiment of the present invention.

Referring now to FIG. 3, a first embodiment of the present invention is shown. In comparison to FIG. 1, the brake device according to the present invention also includes a brake drum 12 coaxially formed with a wheel 10, a driving mechanism 20 for driving the wheel, a pulling wire 24 actuated by an unshown pedal or handle for controlling the brake and an adjuster 26 for adjusting the tension and stroke of the pulling wire 24. The improvements are described below. One end of the pulling wire 24 is casted with a metal block 22 and secured on a cam 30. The adjuster 26 is fixed on a case of the driving mechanism 20. Each of the two brake shoes 142 and 144 is secured with one end on a pivot 18 and the other end to the cam 30, so the pulling wire 24 will actuate the cam 30 to fasten the brake shoes 142 and 144, grasp the brake drum 12 and stop the wheel 10.

In this embodiment, the brake shoes 142 and 144 are a counter pair of semicircular hoops. One end of each brake shoe is secured on a pivot 18 which is fixed on the case of the driving mechanism 20. The other end of the brake shoe connected to the cam 30 is free to rotate as fastening or loosing the brake drum 12. The rotatable or free ends of the brake shoes 142, 144 are formed with two pins individually engageable with two curvy slots 34, 36 formed on the cam 30. The cam 30 is pivotally secured on a pivot 32 fixed on the case of the driving mechanism 20 and rotatable by operation of the pulling wire 24 to actuate the brake shoes 142 rotating on the pivot 18 and to fasten the brake drum 12 consequently.

Figure 4:
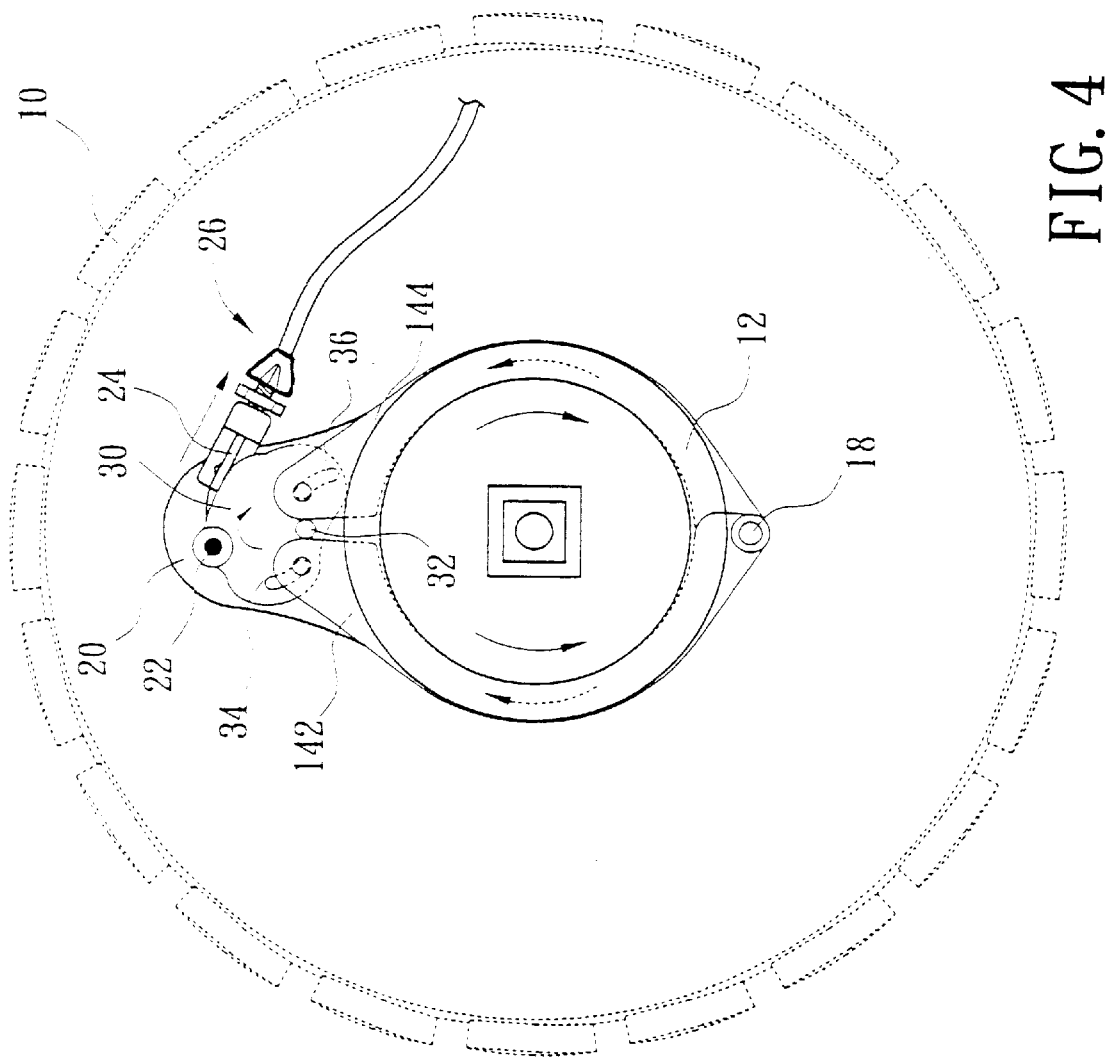
FIG. 4 is a descriptive view showing the working condition of the brake device of FIG. 3.

Further referring to FIG. 3 and FIG. 4 which illustrate respectively the brake device of the present invention in neutral and braking conditions. Please notice the positions of the slots 34, 36 of the cam 30 and the pins of the brake shoes 142, 144 engaging therewith for comparison. When the pulling wire 24 is pulled, the cam 30 rotates clockwise as shown in FIG. 4. Then the pins of the brake shoes 142, 144 engaged in the slots 34, 36 of the cam 30 make the brake shoes 142, 144 rotate, based on the pivot 18, to their fastening position of braking the drum 12 and the wheel 10.

The braking force of the brake shoes 142, 144 to the brake drum 12 can be applied in two directions as shown in FIG. 4 by the dashed arrows and will be described below. Supposing when the vehicle is moving forward, the brake drum 12 and the wheel 10 is rotating clockwise as shown in FIG. 4, then the braking force provided by the brake shoe 142 in the same direction as the brake disc 12 is the major braking force, while the braking force provided by the brake shoe 144 in the reverse direction to the brake disc 12 is the minor force. On the contrary, when the vehicle is moving backward, the brake disc 12 and the wheel 10 is rotating counterclockwise as shown in FIG. 4, then the braking force provided by the brake shoe 142 in the reverse direction to the brake drum 12 is the minor force, while the braking force provided by the brake shoe 144 in the same direction as the brake drum 12 is the major force. Therefore, the brake device according to the present invention always provides the same braking performance whenever the wheel 10 rotates clockwise or counterclockwise. It overcomes the drawbacks of the conventional brake device. The usage of the cam 30 in this embodiment is first to equalize the force providing respectively to the brake shoes 142 and 144, and secondly to save effort of operation by a lever principle that the moment of force from the metal block 22 to the pivot 32 is larger than the moment of force from the pins in the slots 34, 36 to the pivot 32 as shown. So, a child can easier operate the braking by saving his or her effort.

Figure 5:
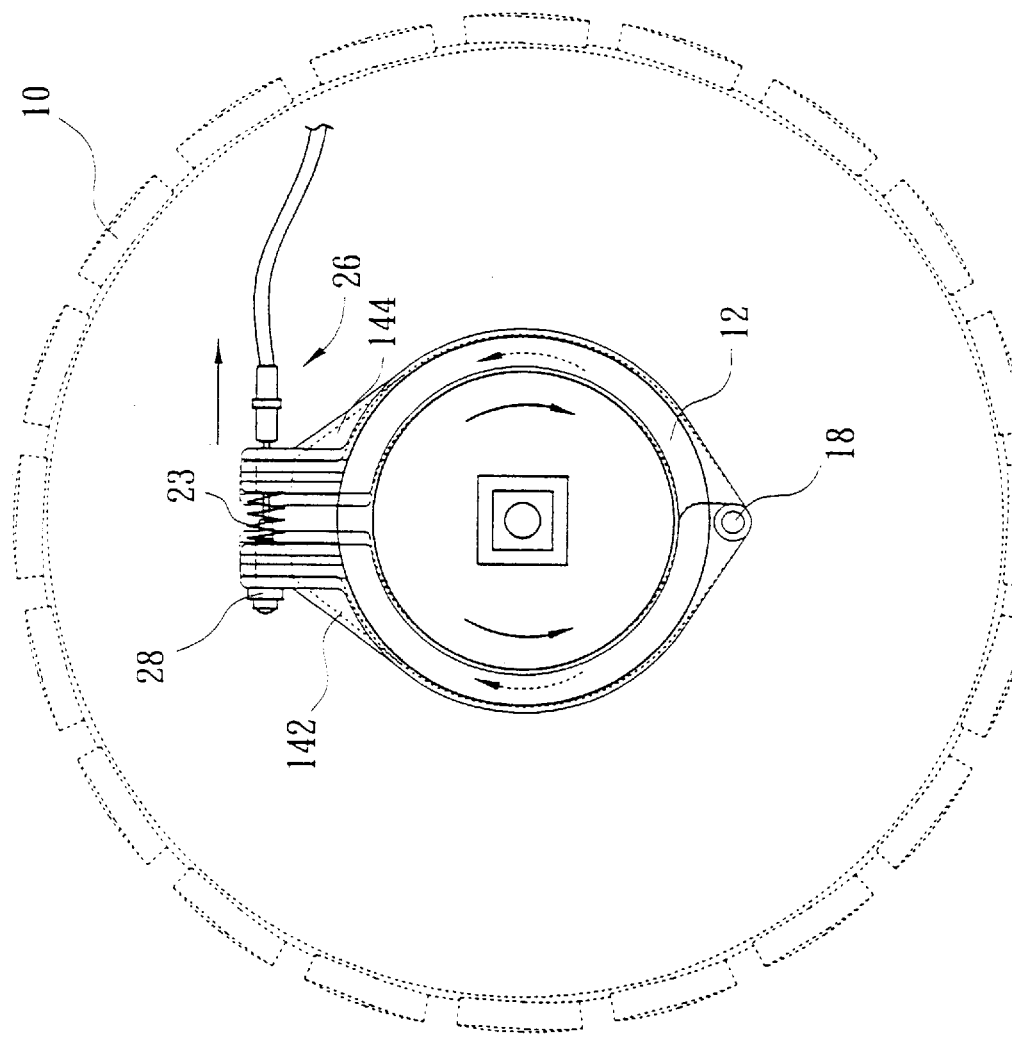
FIG. 5 is a brake device as a second embodiment of the present invention.

Further referring to FIG. 5 which illustrates a brake device as a second embodiment of the present invention. It differs from the first embodiment shown in FIG. 3 by omitting the cam 30. The two brake shoes 142, 144 are also pivotally secured on a pivot 18. But the free ends of brake shoes 142, 144 are connected directly to an adjuster 26. An expansion spring 23 and a screw 28 are used to adjust the tension and stroke of the pulling wire. By this arrangement, the brake shoes 142 and 144 also provide the same function as that of the first embodiment to effectively grasp the brake drum 12 and the wheel 10 in different rotational directions whenever the brake device is operated.

Figure 1:
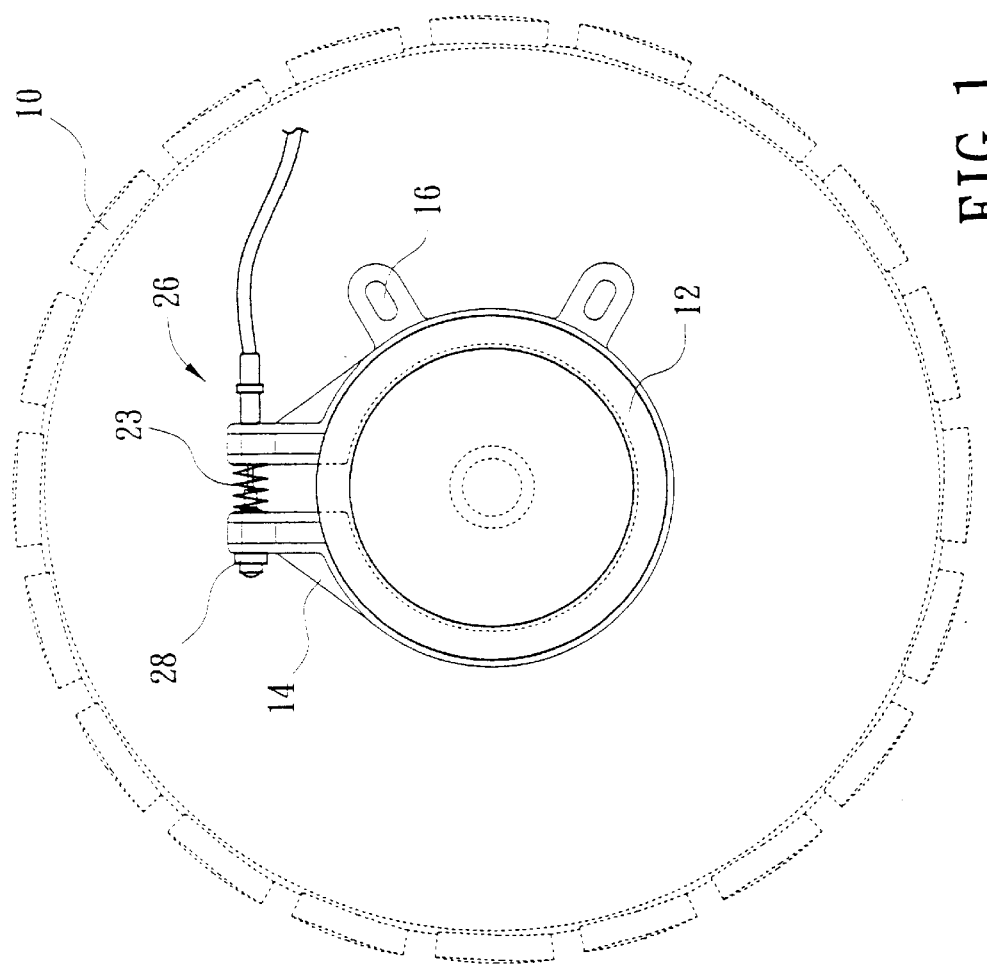
FIG. 1 is a conventional brake device for a motorized children's vehicle which is described above.
Figure 2:
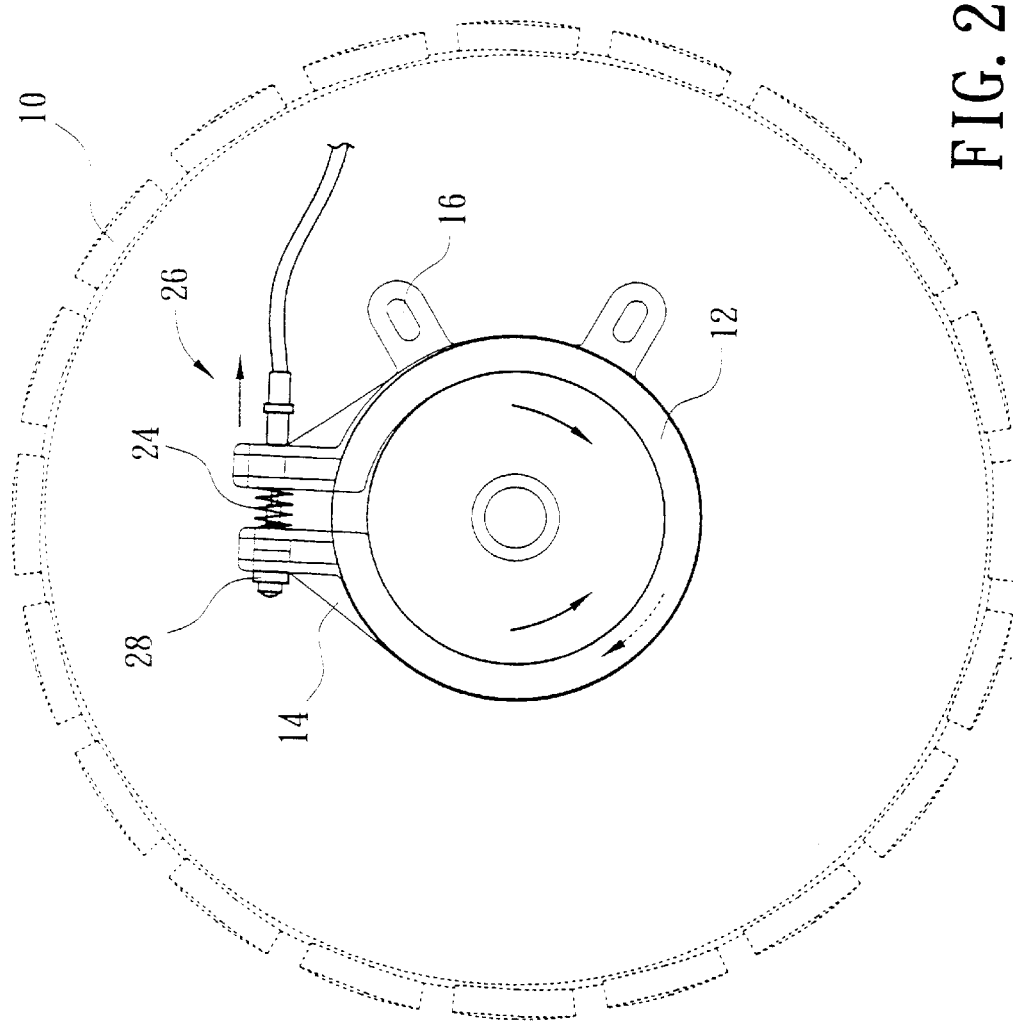
FIG. 2 is a descriptive view showing the working condition of the conventional brake device of FIG. 1.

Moreover, besides the shapes of the brake shoes 142, 144 in FIG. 3 and FIG. 5 of semicircular hoops, the shape of them may also be of almost fall circle as shown in FIG. 1. So each of the brake shoes 142, 144 is pivotally secured to a fixed pivot 18 relatively to the brake drum 12. And the two brake shoes 142, 144 are installed in parallel around the brake drum 12 for providing larger braking force since their larger contact areas.

While the invention has been described in its preferred embodiments, it is to be understood that the words which have been used are words of description rather than limitation and that changes within the purview of the appended claims may be made without departing from the true scope and spirit of the invention.

I claim:

1. A brake device for a children's vehicle, comprising:
    a brake drum rotating along with a wheel;
    a pair of brake shoes, each pivotally secured at one end to a pivot located at a fixed portion relatively to said brake drum and capable of counterly fastening the circumference of said brake drum;
    a cam pivotally provided in said brake device, said cam having a pair of curvy slots for respectively and movably receiving a pin provided on another end of each of said brake shoes;
    wherein said curvy slots are structured so that when said cam is moved pivotally during braking, said brake shoes will rotate pivotally about said fixed portion to fasten said brake drum and stop said wheel.

2. A brake device for a children's vehicle as claimed in claim 1 wherein said cam is pivotally secured on a pivot and activated by a pulling wire for fastening said brake drum in a labor-saving manner.

3. A brake device for a children's vehicle as claimed in claim 1 wherein said brake shoes are two semicircular hoops pivotally secured to said pivot, and counterly surrounding said circumference of said brake drum.

4. A brake device for a children's vehicle as claimed in claim 1 wherein said brake shoes are two almost-full circular hoops pivotally secured to said pivot, and surrounding in parallel said circumference of said brake drum.

* * * * *